(12) United States Patent
Gallizio et al.

(10) Patent No.: US 8,249,206 B2
(45) Date of Patent: Aug. 21, 2012

(54) METHOD AND APPARATUS FOR CHANNEL ESTIMATION IN COMMUNICATION SYSTEMS, AND RELATED COMPUTER PROGRAM PRODUCT

(75) Inventors: Edoardo Gallizio, Milan (IT); Sandro Bellini, Monza (IT); Alessandro Tomasoni, Lesmo (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 969 days.

(21) Appl. No.: 12/201,218

(22) Filed: Aug. 29, 2008

(65) Prior Publication Data

US 2009/0067520 A1    Mar. 12, 2009

Related U.S. Application Data

(60) Provisional application No. 60/967,085, filed on Aug. 31, 2007.

(51) Int. Cl.
*H04B 1/00* (2006.01)

(52) U.S. Cl. ....... 375/350; 375/148; 370/465; 455/63.1; 455/67.11; 455/226.1; 455/307

(58) Field of Classification Search ................... 375/144, 375/148, 260, 267, 278, 284, 285, 340, 346–348, 375/350; 455/501, 63.1, 67.11, 67.13, 226.1–226.3, 455/296, 307; 370/203, 208, 319, 344, 464, 370/465, 478, 480, 482
See application file for complete search history.

(56) References Cited

U.S. PATENT DOCUMENTS

| 7,324,606 B2 * | 1/2008 | Eilts et al. ..................... 375/316 |
| 7,656,958 B2 * | 2/2010 | Lo et al. ......................... 375/260 |
| 7,904,848 B2 * | 3/2011 | Coene et al. ................... 716/126 |
| 8,031,786 B2 * | 10/2011 | Wang et al. .................... 375/260 |
| 2007/0211827 A1 * | 9/2007 | Baggen et al. ................ 375/316 |

OTHER PUBLICATIONS

I.Emre Telatar, "Capacity of Multi-Antenna Gaussian Channels," Eur. Trans. Tel., 10, 6, 585-595, Nov. 1999.
G.J. Foschini and M. J.Gans, "On the Limits of Wireless Communication in a Fading Environment," Wireless Pers. Comm., 6, 311-355, Mar. 1998.
IEEE P802.11n™/D1.0, "Draft Amendment to Standard[. . . ]—Part 11: Wireless LAN Medium Access Control (MAC) and Physical Layer (PHY) specifications: Enhancements for Higher Throughput", A. Stephens et al.
IEEE Project P802.16-2004/Cor1-D5, Draft Corrigendum to IEEE Standard for Local and Metropolitan Area Networks—Part 16: Air Interface for Fixed Broadband Wireless Access Systems.
Requirements and recommendations for WiMAX Forum™ Mobility Profiles, WiMAX, Service Providers Working Group, Nov. 9, 2005, pp. 1-34.

(Continued)

*Primary Examiner* — Dac Ha
(74) *Attorney, Agent, or Firm* — Graybeal Jackson LLP (57) ABSTRACT

A method of channel estimation in orthogonal frequency-division multiplexing communication employing three or more subcarriers, wherein frequency correlation exists between the subcarriers. The method includes:
calculating a coarse channel estimate for each of the subcarriers, and
calculating from the coarse channel estimates refined channel estimates for each of the subcarriers,
wherein calculation of the refined channel estimates includes
calculating the parameters of a Wiener Filter having a length of 2 L+1, where L is a positive integer, and
filtering the coarse channel estimates with the Wiener Filter.

24 Claims, 6 Drawing Sheets

OTHER PUBLICATIONS

Ye (Geoffrey) Li, Nambirajan Seshadri and Sirikiat Ariyavisitakuli, "Channel Estimation for OFDM Systems with Transmitter Diversity in Mobile Wireless Channels", IEEE Journal on Selected Areas in Communications, vol. 17, No. 3, pp. 461-471, Mar. 1999.

Michele Morelli and Umberto Mengali, "A comparison of Pilot-Aided Channel Estimation Methods for OFDM Systems", IEEE Transactions on Signal Processing, vol. 49, No. 12, pp. 3065-3073, Dec. 2001.

Ye (Geoffrey) Li, "Simplified Channel Estimation for OFDM Systems With Multiple Transmit Antennas", IEEE Trans. on Wireless Communications, vol. 1, No. 1, pp. 67-74, Jan. 2002.

Quazi Mehbubar Rahman and Mostafa Hefnaw, "Channel Estimation Methods for MIMO-OFDM System: Time Domain Versus Frequency Domain", Department of Electrical & Computer Engineering Royal Military College of Canada, IEEE 2004, pp. 689-692.

Ove Edfors, Magnus Sandell, Jan-Jaap Van De Beek, Sarah Kate Wilson, and Per Ola Borjesson, "OFDM Channel Estimation by Singular Value Decomposition", IEEE Trans. on Communications, vol. 46, No. 7, pp. 931-939, Jul. 1998.

Ove Edfors, Magnus Sandell, Jan-Jaap Van De Beek, Sarah Kate Wilson, and Per Ola Borjesson, "OFDM Channel Estimation by Singular Value Decomposition", Vehicular Technology Conference; Atlanta, GA Apr. 28-May 1, 1996.

Luc Deneire, Patrick Vandenameele, Liesbet Van Der Perre, Bert Gyselinckx, and Marc Engels, "A low complexity ML channel estimator for OFDM", IEEE International Conference on Communications, Helsinki, Finland, 2001.

Luc Deneire, Patrick Vandenameele, Liesbet Van Der Perre, Bert Gyselinckx, and Marc Engels, "A low complexity ML channel estimator for OFDM", IEEE Transactions on Communications, vol. 51, No. 2, Feb. 2003.

* cited by examiner

METHOD AND APPARATUS FOR CHANNEL ESTIMATION IN COMMUNICATION SYSTEMS, AND RELATED COMPUTER PROGRAM PRODUCT

PRIORITY CLAIM

This application claims priority from U.S. Provisional Patent Application No. 60/967,085, filed Aug. 31, 2007, which is incorporated herein by reference.

TECHNICAL FIELD

An embodiment of the present disclosure relates to the field of wireless communication technology. More specifically, an embodiment of the disclosure was developed by paying attention to its possible use for channel estimation in orthogonal frequency-division multiplexing (OFDM) communication systems.

BACKGROUND

Throughout this description various publications are cited as representative of related art. For the sake of simplicity, these documents will be referred by reference numbers enclosed in square brackets, e.g., [x]. A complete list of these publications ordered according to the reference numbers is reproduced in the section entitled "References" at the end of the description.

Wireless transmission through multiple antennas, also referred to as Multiple-Input Multiple-Output (MIMO) [1]-[2], currently enjoys great popularity because of the demand of high-data-rate communication from multimedia services.

Many applications are considering the use of MIMO to enhance the data rate and/or the robustness of the link; among others, a significant example is provided by the next generation of wireless LAN networks (W-LANs), see e.g., the IEEE 802.11n standard [3]. Another candidate application is represented by mobile "WiMax" systems for fixed wireless access (FWA) [4]-[5]. Besides fourth generation (4G) mobile terminals will likely endorse MIMO technology and as such represent a very important commercial application for embodiments of the present disclosure.

OFDM has been adopted in several high-speed wireless communication standards, mainly due to its capability to effectively combat Inter Symbol Interference (ISI), and to the high spectral efficiency achieved by spectrum overlapping through the adoption of a Fast Fourier Transformation (FFT).

In addition, the multi-path propagation typical of indoor environments can provide high capacities, if properly exploited. This can be achieved by employing multi-element antenna arrays at both the transmitter and the receiver side, hence creating a MIMO communication system.

Serial-Input Serial-Output (SISO), Serial-Input Multiple-Output (SIMO) and MIMO architectures often require accurate Channel State Information (CSI) at the receiver side to perform coherent detection.

Especially in orthogonal frequency division multiplexing (OFDM) communication systems paths between each transmitting and receiving antenna are estimated, for each OFDM subcarrier (tone) involved in the transmission process.

Systems based on a packet transmission, with the periodical insertion of a preamble, containing known sequences (called training sequences), allow synchronization and channel estimation at the beginning of each transmission.

A severe case is a MIMO indoor channel in which multiple reflections and spatial diversity may cause severe interference on the received signals, so that they channel has to be properly estimated and resolved to allow adequate reception.

The general concept of channel estimation in MIMO communication systems will be analyzed in the following, however the same principles apply also to SISO and SIMO communication systems.

MIMO-OFDM systems typically work in indoor environments, rich in obstacles, reflections and scattering.

For this reason, the link between each transmitting and receiving antenna includes multiple paths (called taps), each one with different gain and phase (consequence of a different time arrival to the receiver), resulting in channels with long power delay profiles (PDP), the power spread at the receiver of a hypothetical transmitted impulse h(t), defined as:

$$PDP(t)=E[|h(t)|^2] \qquad (1)$$

This channel model takes into consideration the comparison criteria used, e.g., for the IEEE 802.11n standard [4].

This model foresees at least three degrees of randomness: uniformly distributed blocks of paths with casual exponentially decaying power, both between clusters and inside each cluster.

The higher the number of relevant taps, the lower the correlation between adjacent tones and vice versa.

In fact, in the case of a channel with ideal impulse response, its Fourier transform would be a constant, because each tone would be fully correlated with all other tones.

On the contrary, if the channel were made of Gaussian taps, equal to the number of FFT points, the correlation between two adjacent tones would be null, which is known as the condition of maximum frequency selectivity.

For example in a typical office environment large PDPs exist and adjacent tones appear highly correlated. Generally the correlation values between a first carrier n and second carrier spaced by m can be calculated according to:

$$R_{r_1,t_1,r_2,t_2}(m)=E[h_{r_1,t_1}*(n)h_{r_2,t_2}(n+m)] \qquad (2)$$

Generally, Channel Estimation (CE) can be performed either in the time or frequency domain [6], [10], [11].

One method exploits the knowledge of the channel impulse-response length, and generally guarantees better performance, at the cost of drastically higher computational complexity [6], [7].

Several methods have been proposed in the literature to improve the performances of channel estimation methods [8], [9], but usually the complexity of the solutions is not taken into account and they are not practical in a communication system.

SUMMARY

Embodiments of the present disclosure include a method, corresponding apparatus (e.g., a channel estimator and a related receiver), as well as a corresponding related computer program product, loadable in the memory of at least one computer and including software code portions for performing the steps of a method according to an embodiment of the disclosure when the product is run on a computer. As used herein, reference to such a computer program product is intended to be equivalent to reference to a computer-readable medium containing instructions for controlling a computer system to coordinate the performance of a method. Reference to "at least one computer" is intended to highlight the possibility for an embodiment of the present disclosure to be implemented in a distributed/modular fashion.

An embodiment of the arrangement described herein is concerned with the problem of Channel Estimation, to allow the proper reception of a SISO, SIMO or MIMO-OFDM signal.

Another embodiment of the arrangement described herein improves the quality of the previously computed channel estimation, and can be suitable for any kind of OFDM system with frequency correlation between subcarriers.

An embodiment of the arrangement described herein exploits the correlation between adjacent tones to reduce the noise affecting the channel estimation: for example if a tone were fully correlated with the previous and the subsequent one, each estimation could be updated with an average of these three values, resulting in a noise reduction by three times and obtaining a channel estimation gain equal to $10 \log_{10}(3) \approx 4.8$ dB. In the same way, an average of five estimations, would result in a gain of $10 \log_{10}(5) = 7$ dB. These large values are upper bounds, but also good results may also be obtained in more realistic conditions.

An embodiment of the arrangement described herein takes advantage of the analysis carried out in [7]; there a singular value decomposition is used to obtain a stable solution.

An embodiment of the arrangement described herein provides a solution to the presence of virtual carriers: to that effect, an embodiment of this arrangement estimates the correlation matrix H'H of the same OFDM symbol, applying some simplifications. For instance, a decomposition of the matrix in a first part with a Toeplitz structure and a second corrective term at the border is performed. In second step the filter is made symmetric, without any degradation in performance.

An embodiment of the arrangement described herein presents at least three advantages, that are promising for its possible use in next generation wireless communication, especially for SISO, SIMO and MIMO channel estimation:
the overall complexity is low;
a significant performance gain;
a parallelizable architecture, which is suitable for an Application Specific Integrated Circuit (ASIC) implementation and also to yield the low latency often required by a real-time high-data rate transmission.

An embodiment of the arrangement described herein is suitable for improving the performance of a Training Assisted Channel Estimation (TA-CE) in Multiple Input-Multiple Output (MIMO) Orthogonal Frequency Division Multiplexing (OFDM) systems. More specifically the embodiment uses a Channel Estimation refinement, called smoothing, which combines coarse Channel Estimations belonging to adjacent tones to obtain a new and less noisy estimation

BRIEF DESCRIPTION OF THE DRAWINGS

For a more complete understanding of this disclosure, reference is now made to the following description of one or more exemplary embodiments, taken in conjunction with the accompanying drawings.

DETAILED DESCRIPTION

Introduction

When the modulated subcarrier signals of an OFDM signal are transmitted through a channel such as the atmosphere, the channel often attenuates the amplitudes of the modulated subcarriers, and delays the modulated subcarriers, the delay imparted to each modulated subcarrier imparting a respective phase shift to that carrier signal. In addition, where the modulated subcarriers traverse multiple paths between the transmitter and the receiver (e.g., due to the subcarriers bouncing off objects), the combined affect of this multipath phenomenon may further distort the amplitudes and phases of one or more of the modulated subcarriers.

Because the transmitted data is represented by the amplitudes and phases of the modulated subcarrier signals, a receiver often estimates the respective phase shift and respective amplitude attenuation that the channel imparts to each of the modulated subcarrier signals, and uses these estimates to correct for the subcarrier-signal attenuations and phase shifts in an effort to accurately recover all of the data within a transmitted symbol.

One technique for estimating the subcarrier-signal attenuations and phase shifts at the receiver calls for the transmitter to send out a training symbol that is known to the receiver and that uses at least some of the available subcarriers. Because the training symbol is known to the receiver, the receiver determines the attenuations and phase shifts that the channel imparts to the modulated subcarriers by comparing the respective attenuations and phase shifts of the received subcarrier signals with the known, ideal modulated-subcarrier attenuations and phase shifts. For example, the receiver determines the phase shift that the channel imparts to the first modulated subcarrier signal f0 by taking the difference between the known ideal phase shift (typically 0°) of f0 and the actual phase shift of the received f0.

One way that the receiver may recover a subsequently received symbol is by adding the inverses of the determined attenuations and phase shifts to the respective actual attenuations and phase shifts of the received subcarrier signals.

A possible problem with the above-described technique is that there may be channel noise that affects the receiver's estimation of the modulated-subcarrier attenuations and phase shifts.

Because the amplitude of the noise on each modulated subcarrier is typically random, one way to reduce the effect that this noise may have on the channel attenuations and phase shifts determined by the receiver is to have the receiver average the attenuations and phase shifts over more than one modulated subcarrier signal. Since the distortions experienced by a subcarrier will typically be similar to the distortions experienced by the immediately adjacent subcarriers (i.e., the distortion is typically smoothly varying from one subcarrier to another), some sort of averaging may reduce the effects of noise.

But merely averaging the attenuations of multiple modulated subcarriers may introduce errors into the determined attenuations if the attenuations are uncorrelated. The attenuations are fully correlated if the channel imparts the same attenuation (e.g., a factor of ½) to each modulated subcarrier signal. Conversely, the attenuations are completely uncorrelated if the channel imparts different attenuations to each modulated subcarrier signal. Typically, the attenuations imparted to modulated subcarrier signals that are adjacent in frequency (e.g., carriers f0, f1, and f2) are more closely correlated than the attenuations imparted to modulated subcarriers that are spaced apart in frequency (e.g., f5, f100, and f230), although this is not always the case.

Similarly, merely averaging the phase shifts imparted to multiple modulated subcarrier signals may introduce errors into the determined phase shifts if the subcarrier-signal delays are uncorrelated. The delays, and thus the corresponding phase shifts, are fully correlated if the channel imparts the same time delay to each modulated subcarrier. Conversely, the delays, and thus the phase shifts, are completely uncorrelated if the channel imparts different delays to each modulated subcarrier. Typically, the delays, and thus the phase shifts, imparted to modulated subcarrier signals that are adjacent in frequency (e.g., f0, f1, and f2) are more closely correlated than the delays, and thus the corresponding phase shifts, imparted to modulated subcarriers that are spaced apart in frequency (e.g., f5, f100, and f230), although this is not always the case.

So, for example, assume that the channel imparts the same time delay to each of three adjacent subcarrier signals, f1, f2, and f3. Therefore, the phase shifts imparted to these subcarriers increase linearly as one goes up in frequency from f2, and decrease linearly as one goes down in frequency. For example, excluding the affect of noise, a case of full correlation might yield the phase shift for f1 at 3°, for f2 at 6°, and for f3 at 9°, where f2=2f1, and f3=3f1. An average of these numbers for f2 equals 6°, which is the actual phase shift. So in this case of full correlation, a straight average of the phase shifts for f1, f2, and f3 may reduce the error in the estimated phase shift of f2 by averaging out noise (since the noise at the different frequencies is random and uncorrelated). And one may further increase the accuracy of the estimated phase shift imparted to f2 by the channel if he increases the number of modulated sub carrier signals over which the average is taken.

But in actuality, rarely is there perfect correlation of the attenuation and phase shifts imparted by the channel to adjacent modulated subcarrier signals.

However, one may determine the respective correlations of the attenuation and phase shift of each subcarrier signal with the attenuations and phase shifts of every other subcarrier signal from an initial measurement, and then weight the attenuations and phase shifts based on the correlation of the attenuations and phase shifts of at least some of the other modulated subcarriers. In other words, the effects of noisy measurements of amplitude and phase on a given subcarrier may be reduced by using a weighted average with adjacent subcarriers, with the weights determined from the degree of correlation between the amplitudes and between the phases of nearby subcarriers. This is accomplished using correlation matrices, as described in detail below.

As an example, consider three subcarriers whose channel distortions are well correlated. The actual amplitudes of the three subcarriers are 0.8, 1.0, and 1.2. In this example, assuming that these three subcarriers were transmitted with the same amplitude, then the attenuations are linearly correlated relative to the middle subcarrier. Linearly correlated attenuations may be considered to be well-correlated attenuations. Since the attenuations of the three subcarriers are well correlated, we can use an average of the three amplitudes to estimate the amplitude of the middle subcarrier. Since the average is (0.8+1.0+1.2)/3=1.0, this gives the correct result. However, the initially measured amplitudes of the three subcarriers may be corrupted by noise. Suppose the measured amplitudes of these three subcarriers is 0.7, 1.2, and 1.3 due to noise. Without any averaging, the amplitude of the middle subcarrier would be estimated as 1.2 instead of the correct value of 1.0. However, if the estimate is based on an average, the value is (0.7+1.2+1.3)/3=1.067, which is much closer to the correct value. Thus the use of an average may substantially reduce the effects of noise on the channel estimates.

In the case of less correlated distortions, a weighted average may be used, with the weights adjusted in an optimum way using a known technique such as a Wiener filter. (The Wiener filter is an adaptive filter that tailors itself to be the "best possible filter" for a given degree of correlation and noise.) These weights are effectively a way to fit the actual correlation to full correlation.

The above embodiment may be extrapolated to more than three modulated subcarriers, and also may be applied to the phase shifts that the channel imparts to the modulated subcarriers.

So, a summary of an embodiment of the above technique is as follows.

First, the receiver receives the training symbol, and determines the attenuations and the phase shifts that the channel imparts to the subcarrier signals. Alternatively, the receiver may receive multiple training symbols in sequence, and determine the attenuations and phases shifts that the channel imparts to the subcarrier signals by taking averages over the multiple training symbols to average out noise temporally.

Next, the receiver determines how the attenuation of each subcarrier signal is correlated to the attenuations of the other subcarrier signals, and determines how the phase shift of each subcarrier signal is correlated to the phase shifts of the other subcarrier signals. Alternatively, the receiver may determine these correlations for only a predetermined number, e.g., five, of subcarrier signals adjacent to the subcarrier signal in question (e.g., five subcarrier signals above the subcarrier signal in question, and five subcarrier signals below the subcarrier signal in question).

Then, for each subcarrier signal, the receiver calculates a respective set of weighting functions (e.g., a multiplier) for the attenuations and phases shifts of the other subcarrier signals.

The receiver may re-determine the attenuations and phase shifts imparted to the subcarrier signals by the channel, and may re-determine the sets of weighting functions, in the above manner each time that a training symbol is received.

Next, the receiver receives a data-carrying symbol, and determines the raw attenuations and phase shifts of the modulated subcarriers that compose the signal.

Then, for each subcarrier signal, the receiver weights the raw attenuations and phase shifts of the other subcarrier signals using the above-calculated weighting functions.

Next, the receiver calculates the estimated attenuation and phase shift of each subcarrier signal from the raw attenuation and phase shift of the subcarrier signal and from the weighted attenuations and phase shifts of the other subcarrier signals by averaging or another algorithm.

Then, the receiver corrects the calculated actual attenuation and phase shift of each subcarrier signal using the previously determined attenuation and phase shift that the channel imparts to the subcarrier signal.

From the corrected attenuation and phase shift of each subcarrier signal, the receiver recovers the data carried by the subcarrier signal.

To perform the weighting of the other subcarrier signals and the averaging of the weighted other subcarrier signals with the subcarrier signal in question, the receiver may use a Weiner filter, where the Weiner coefficients are the same as or are related to the weighting functions calculated above. Of course, for each subcarrier signal, the weighing functions, and thus the filter coefficients, may be different than for other subcarrier signals. However, the coefficients of a Weiner filter are adaptive, and may thus be easily changed from subcarrier signal to subcarrier signal. That is, after calculating the attenuation and phase shift of one subcarrier signal, then Weiner filter may be loaded with the coefficients for the next subcarrier signal for which the Weiner filter will calculate the attenuation and phase shift.

In an embodiment of the disclosure, there are some boundary conditions that apply to the above algorithm.

For example if there is little or no channel noise, then one does not need to use weighted averaging to determine the attenuation and phase shift of each subcarrier signal; instead, the receiver may use the attenuation and phase shift provided by the receiver FFT. Also, if the attenuations and phase shifts imparted to the subcarrier signals by the channel are well correlated, then the receiver need not weight the attenuations and phase shifts of the other subcarriers before performing the averaging. Or, if the attenuations and phase shifts are not well correlated, then the receiver may determine the attenuation and phase shift of each subcarrier signal without averaging them with the respective amplitudes and phases of other subcarriers.

In yet another embodiment, there are times where there are certain subcarrier frequencies within the OFDM frequency range that are not used because the performance over the channel is poor. For example, suppose an OFDM system includes 512 subcarriers, and a channel makes the use of subcarriers 200-300 impractical or impossible because the attenuation and/or phase shift is so great that it would be impractical or impossible for the receiver to correct for it. So, the receiver notifies the transmitter to use only subcarriers 0-199 and 301-512.

In such an embodiment, the receiver uses only adjacent subcarriers within the same group of subcarriers to determine the attenuation and phase shift of a subcarrier signal. For example, for subcarrier 100, the receiver uses only other subcarrier signals within the range 1-199 to determine the attenuation and phase shift of the subcarrier 100. Likewise, for the subcarrier 400, the receiver uses only other subcarriers within the range 301-512 to determine the attenuation and phase shift of the subcarrier 400.

DETAILED DISCUSSION

Figure 1A:
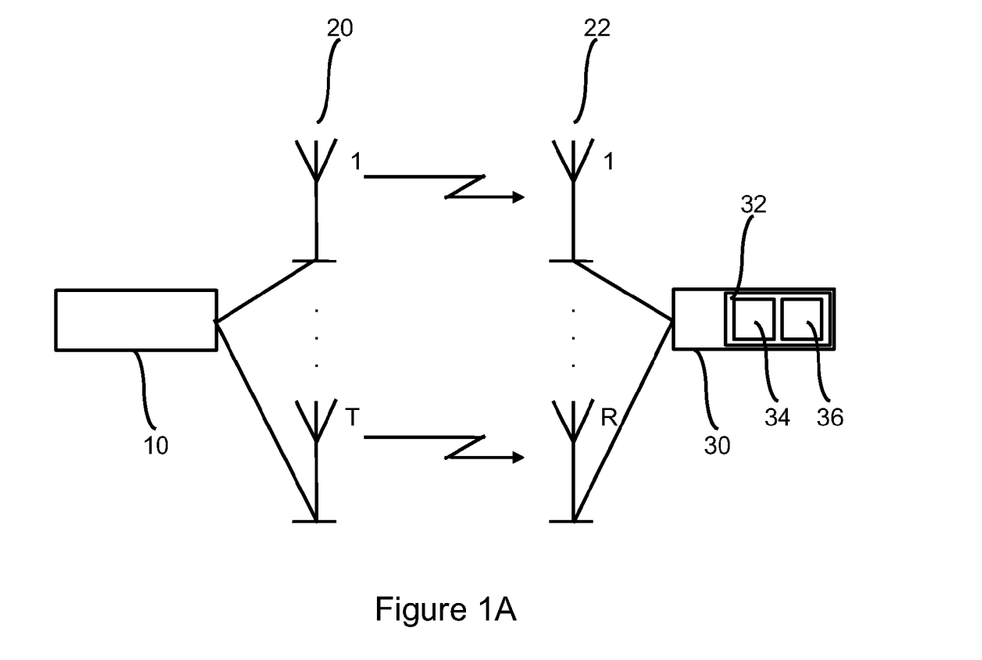
FIGS. 1A and 1B illustrate exemplary systems for detecting communications from multiple sources.
Figure 1B:
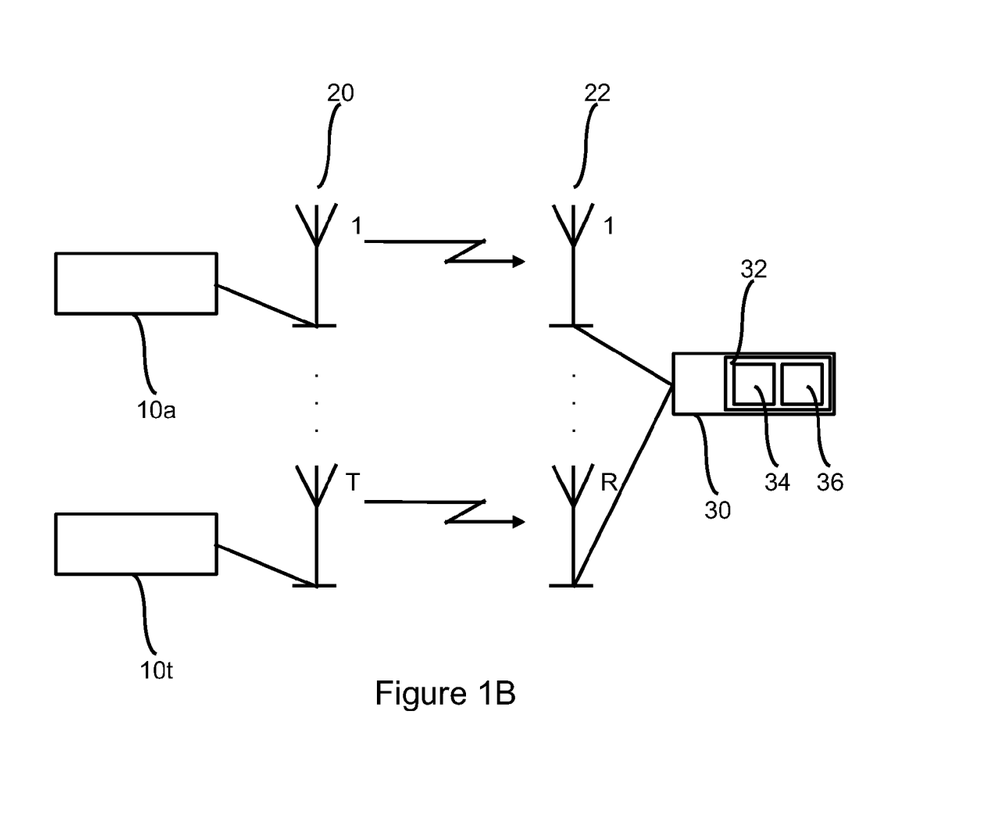

FIGS. 1A and 1B illustrate exemplary systems for communication via multiple communication sources in accordance with this disclosure. In particular, FIGS. 1A and 1B illustrate two exemplary MIMO systems. These embodiments are for illustration only. Other embodiments of the systems could be used without departing from the scope of this disclosure.

As shown in FIG. 1A, the system includes a transmitter 10 and a receiver 30. The transmitter 10 includes or is coupled to multiple transmit antennas 20 (denoted 1-T), and the receiver 30 includes or is coupled to multiple receive antennas 22 (denoted 1-R).

As shown in FIG. 1B, the system could also include multiple transmitters 10a-10t and the receiver 30. In this example, each of the transmitters 10a-10t includes or is coupled to a single transmit antenna 20.

Each of the transmitters 10, 10a-10t in FIGS. 1A and 1B can be obtained by any suitable device or component capable of generating or providing data for communication. The receiver 30 can be obtained by any suitable device or component capable of receiving communicated data. The multiple sources could include a single transmitter 10 with multiple antennas 20, multiple transmitter 10a-10t with one or several antennas 20 each, or a combination thereof.

The receiver 30 includes a block 32, which performs channel estimation, detection and decoding. Specifically, the block 32 can be obtained by any hardware, software, firmware, or combination thereof for performing channel estimation as will be described in more detail below. The block 32 could be implemented in any suitable manner, such as by using an Application Specific Integrated Circuit ("ASIC"), Field Programmable Gate Array ("FPGA"), digital signal processor ("DSP"), or microprocessor. In the example shown, the block 32 includes one or more processors 34 and a memory 36 capable of storing data and instructions used by the processors 34.

Figure 2A:
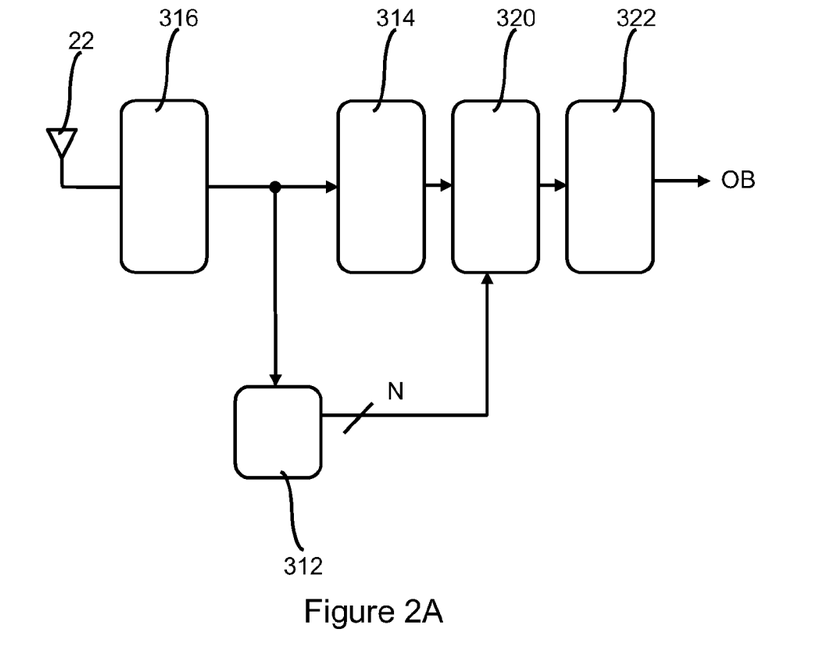
FIG. 2A and FIG. 2B represent two block diagrams illustrating exemplary generic receivers for a communication system, one referring to a Single-Output system and the other one for a Multiple-Output system.
Figure 2B:
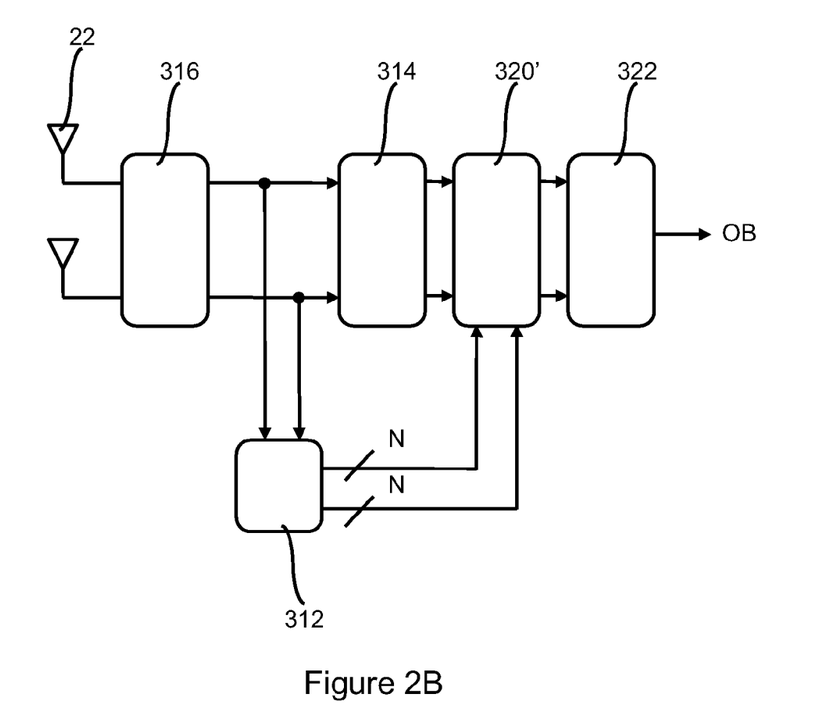

Because an embodiment of the present disclosure is a new method and apparatus to improve the channel estimation especially for both SISO and MIMO-OFDM system, in that respect FIGS. 2A and 2B show the basic elements of two exemplary receivers for OFDM communication.

FIG. 2A shows a generic Single-Output OFDM receiver block diagram.

Such a receiver typically has associated therewith a receiver antenna 22. The signal of the antenna 22 is fed, after a typical preprocessing including e.g., analog to digital conversion, to a synchronizer 316. An OFDM demodulator and de-framing block 314 and an equalizer 320 are then able to detect the transmitted signal sequence. Usually the detection of the signal sequence by the equalizer 320 can be improved if channel estimates from a channel estimator 312 are considered. Finally, a channel decoder might decode the signal sequence and output the decoded output stream OB.

Similarly, FIG. 2B shows a generic Multiple-Output OFDM receiver block diagram. While the receiver of FIG. 2A has only a single antenna 22, the receiver of FIG. 2B has associated therewith multiple antennas 22. In the case of Multiple-Output receivers, typically a MIMO detector 320' is used instead of the equalizer 320.

Figure 3:
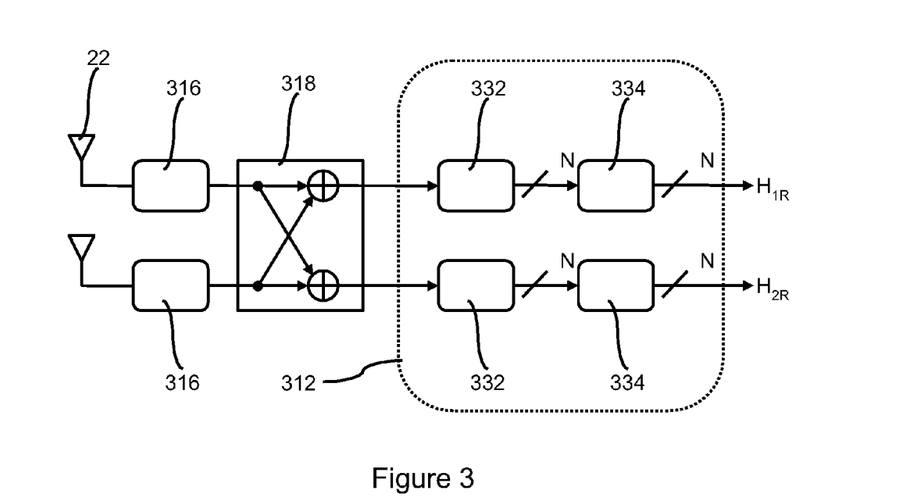
FIG. 3 is a block diagram illustrating the steps performed according to an embodiment of the present disclosure.

In that respect, FIG. 3 shows the general approach of the channel estimator according to an embodiment of the disclosure with an example of a generic Multiple-Output receiver block diagram. In FIG. 3, the blocks with a function corresponding to that of blocks already described in FIGS. 2A and 2B are indicated by the same reference numbers.

As already shown in FIGS. 2A and 2B the output of the synchronizer 316 is fed to the channel estimator 312.

An interference elimination block 318 may be introduced between the synchronizer 316 and the channel estimator 312 in order to improve the results.

More specifically the channel estimator 312 comprises a basic channel estimator 332, which computes a noisy coarse channel estimate e.g. from long training symbol (LTS) preambles, and a block 334 for channel estimation refinement.

An embodiment of the disclosure provides arrangements for calculating the channel estimation refinement in the block 334.

In the following the basic concepts of Wiener Filters at the example of SISO-OFDM systems will be described, without considering virtual carriers. The coarse channel estimator, exploiting, e.g., LTS preambles, computes a noisy estimation of the $k^{th}$ tone:

$$\hat{h}_k = h_k + n_k \quad (3)$$

where $n_k$ is an independent and identically distributed Additive White Gaussian Noise (AWGN) variable.

The vectors $\hat{h}_k$, $h_k$ and $n_k$ can be defined as sequences of the corresponding scalar elements ranging from k−L to k+L, where k is the central element and L the number of adjacent considered carriers, per side. Therefore, for vectors equation (3) can be modified to:

$$\hat{h}_k = \begin{bmatrix} \hat{h}_{k-L} \\ \vdots \\ \hat{h}_k \\ \vdots \\ \hat{h}_{k+L} \end{bmatrix} = h_k + n_k = \begin{bmatrix} h_{k-L} \\ \vdots \\ h_k \\ \vdots \\ h_{k+L} \end{bmatrix} + \begin{bmatrix} n_{k-L} \\ \vdots \\ n_k \\ \vdots \\ n_{k+L} \end{bmatrix} \quad (4)$$

These indexes can be assumed to be circular due to a previous FFT processing.

A filter w of length 2 L+1 is described by the following equation:

$$\tilde{h}_k = w^H \hat{h}_k \quad (5)$$

wherein $\tilde{h}_k$ is the new estimation of $h_k$, with the minimum mean square error (MMSE) $E[|e_k|^2]$, where the error is defined as the difference $$e_k = h_k - \tilde{h}_k \quad (6)$$

The minimum mean square error of a linear estimator is equivalent to imposing orthogonality between the observations and the error itself, which means that no further information can be exploited to refine the estimations, if the error is uncorrelated with the observations:

$$E[e_k \hat{h}_k^H] = 0^H \quad (7)$$

From equations (6) and (7) follows:

$$\begin{aligned} E[e_k \hat{h}_k^H] &= E[(h_k - \tilde{h}_k)(h_k + n_k)^H] = E[(h_k - w^H \hat{h}_k)(h_k + n_k)^H] \quad (8)\\ &= E[(h_k - w^H(h_k + n_k))(h_k + n_k)^H] \\ &= E[h_k(h_k + n_k)^H] - w^H E[(h_k + n_k)(h_k + n_k)^H] \\ &= E[h_k h_k^H] - w^H (E[h_k h_k^H] + E[n_k n_k^H]) = 0^H \end{aligned}$$

Defining the frequency-stationary correlation matrices:

$$E[h_k h_k^H] = R_{h_k} = R_h \quad (9)$$

$$E[n_k n_k^H] = N_0 I \quad (10)$$

where $N_0$ is the channel noise and observing that $E[h_k h_k^H] = u_{L+1}{}^H R_h$, it is possible to explicitly write the expression of w:

$$w = (N_0 I + R_h)^{-1} R_h u_{L+1} \quad (11)$$

where $u_{L+1}$ is the column vector of length 2 L+1, with each element equal to zero but the L+1-th (the central one) equal to one (thus selecting the central column of a matrix which left-multiplies it).

As can be derive from equation (5), a Wiener filter combines 2 L+1 noisy estimations to minimize the joint effect of two different errors, the prediction and the AWGN ones:

$$\tilde{h}_k = w^H(h_k + n_k) = w^H h_k + w^H n_k = h_k + (w^H h_k - h_k) + w^H n_k \quad (12)$$

In order to describe more in detail the behavior of the filter in the following are analyzed equations (11) and (5) in some limited situations:

in the absence of noise ($N_0$=0) equation (11) can be written as $$w = (R_h)^{-1} R_h u_{L+1} = u_{L+1}$$

and consequently equation (5) is $$\tilde{h}_k = w^H \hat{h}_k = u^H \hat{h}_k = \hat{h}_k = h_k$$

In other words, the estimation $\hat{h}_k$ represents the correct value of $h_k$, and no further refinement of the coarse estimation are necessary and accordingly the Wiener filter simply selects its central element, without any average with the adjacent elements.

in the case of infinite noise ($N_0 \to \infty$), the channel estimator does not work anymore, because $w \to 0$.

in the case of fully uncorrelated carriers, which means that $$R_h = I_{(2L+1) \times (2L+1)}$$

equation (11) can be written as:

$$w = (N_0 I + I)^{-1} I u_{L+1} = \frac{1}{1 + N_0} u_{L+1}$$

and consequently $$\tilde{h}_k = \frac{1}{1 + N_0} u^H \hat{h}_k = \frac{1}{1 + N_0} \hat{h}_k$$

This means, that it is almost impossible to filter $h_k$, because it is only possible to select the $k^{th}$ element and reduce slightly the noise power over it.

in case the carriers are fully correlated, which means that $$R_h = \begin{bmatrix} 1 & \cdots & 1 \\ \vdots & \ddots & \vdots \\ 1 & \cdots & 1 \end{bmatrix} = 1_{2L+1} \cdot 1_{2L+1}^H, \text{ where } 1 = \begin{bmatrix} 1 \\ \vdots \\ 1 \end{bmatrix}$$

the problem is slightly more complicated. According to an embodiment of the disclosure this problem is solved by a Sherman-Morrison inversion:

$$w = (N_0 I + 11^H)^{-1} 11^H u_{L+1} = \left( \frac{1}{N_0} I - \frac{\frac{1}{N_0} 11^H \frac{1}{N_0}}{1 + \frac{1}{N_0} \underbrace{1^H 1}_{=2L+1}} \right) \underbrace{11^H u_{L+1}}_{=1} \quad (13)$$

$$= \frac{1}{N_0} \left( 1 - \frac{\frac{1}{N_0} \underbrace{11^H}_{=2L+1} \frac{1}{N_0}}{1 + \frac{1}{N_0}(2L+1)} \right)$$

$$= \left( \frac{1}{N_0} - \frac{1}{N_0} \frac{2L+1}{N_0 + (2L+1)} \right) 1 = \frac{1}{N_0 + (2L+1)} 1$$

and consequently equation (5) can be written as:

$$\tilde{h}_k = \frac{1}{N_0 + (2L+1)} 1^H \hat{h}_k = \frac{1}{N_0 + (2L+1)} \sum_{n=k-L}^{k+L} \hat{h}_n.$$

In other words, an average of 2 L+1 coarse estimations can be computed, neglecting the (usually) small term $N_0$.

Figure 4:
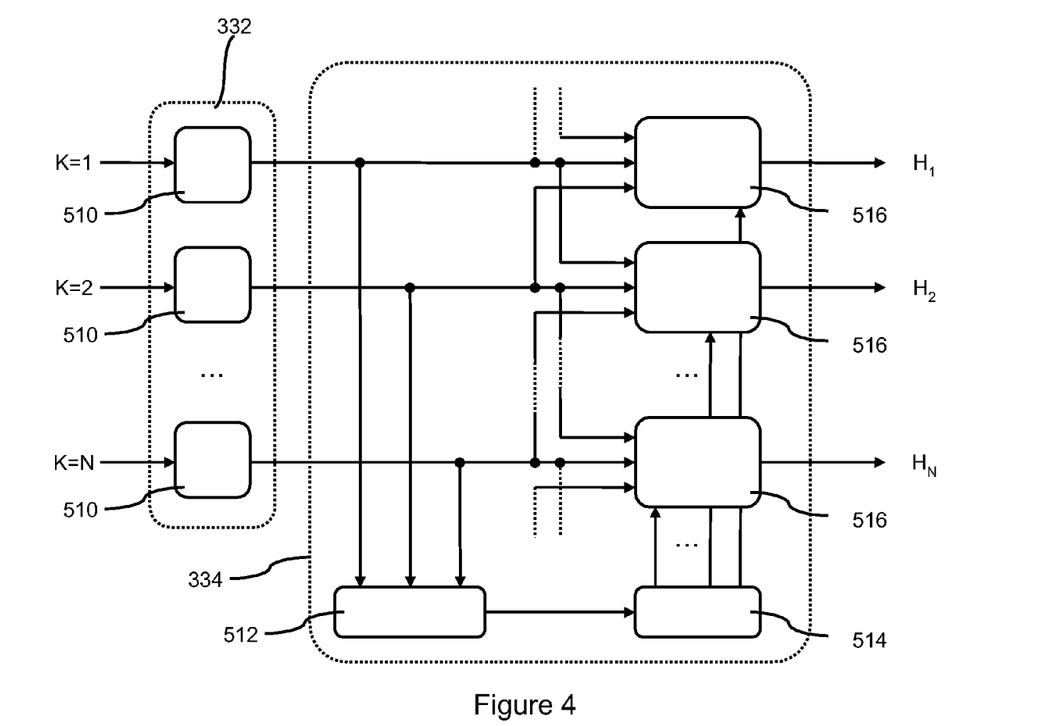
FIG. 4 describes in detail an embodiment of the present disclosure, referring to a generic OFDM system using N subcarriers.

FIG. 4 shows, in that respect, an embodiment of the channel estimator for OFDM-communication systems having N tones.

Each of the tones K={1, ..., N} is fed into a coarse channel estimator 510, which calculates from the long training symbol (LTS) preambles, a noisy estimate of the tone as shown, e.g., in equation (4).

The outputs of the coarse channel estimators 510 are fed to a block 512, which calculates the autocorrelation matrix R.

Based on the estimated autocorrelation matrix R from block 512, a Wiener filter 514 can be adjusted, e.g., as shown in equation (11).

Accordingly, having the coarse channel estimates of adjacent tones from the blocks 512 and the Wiener filter 514, the refined channel estimates can be calculated by the blocks 516, e.g., from equation (5).

In that respect, the autocorrelation matrix computation by block 512, the Wiener filter adjustment by block 514, and the weighted combination performed by the blocks 516 may be realized by any of the alternative arrangements described herein.

More specifically, the arrangements include, but are not limited to, the above-mentioned case without considering virtual carriers, but also the alternative arrangements considering virtual carriers, which will be described in the following.

More specifically, in the following is described Wiener filters for systems including virtual carriers. In particular the smoothing problem will be discussed in the case of absence of coarse estimations, which may, e.g., result from the fact that the LTS have not been transmitted over some tones, called virtual carriers.

In a first instance the problem of a single unknown carrier k=0 will be discussed, because generalization to other positions or to a larger number of virtual carriers is straightforward and will be discussed later on.

Using the smoothing method for a system with virtual carriers is only reasonable for those carriers which have distances larger than L from the unknown channel values, because these values would be required for the filtering process as described by equation (5).

Shorter filters may be employed for carriers which are very close to the virtual carriers.

In the following a generic number L of adjacent considered carriers are considered. In a first step, all elements belonging to those tones in the vectors ĥ, h and n are gathered, which may be improved by a Wiener filter of length 2 L+1. If k=0 is the only virtual carrier equation, (4) can be written as:

$$\hat{h} = \begin{bmatrix} \hat{h}_{L+1} \\ \hat{h}_{L+2} \\ \vdots \\ \hat{h}_{N-L-2} \\ \hat{h}_{N-L-1} \end{bmatrix} = h + n = \begin{bmatrix} h_{L+1} \\ h_{L+2} \\ \vdots \\ h_{N-L-2} \\ h_{N-L-1} \end{bmatrix} + \begin{bmatrix} n_{L+1} \\ n_{L+2} \\ \vdots \\ n_{N-L-2} \\ n_{N-L-1} \end{bmatrix} \quad (14)$$

where N is the dimension of the FFT.

Accordingly, the augmented coarse estimation, channel and noise matrices may be defined as:

$$\hat{H}' = \begin{bmatrix} \hat{h}_1 & \hat{h}_2 & \cdots & \hat{h}_{2L} & \hat{h}_{2L+1} \\ \hat{h}_2 & \hat{h}_3 & \cdots & \hat{h}_{2L+1} & \hat{h}_{2L+2} \\ \vdots & \vdots & \ddots & \vdots & \vdots \\ \hat{h}_{N-2L-2} & \hat{h}_{N-2L-2} & \cdots & \hat{h}_{N-3} & \hat{h}_{N-2} \\ \hat{h}_{N-2L-1} & \hat{h}_{N-2L} & \cdots & \hat{h}_{N-2} & \hat{h}_{N-1} \end{bmatrix} = \quad (15)$$

$$H' + N' = \begin{bmatrix} h_1 & h_2 & \cdots & h_{2L} & h_{2L+1} \\ h_2 & h_3 & \cdots & h_{2L+1} & h_{2L+2} \\ \vdots & \vdots & \ddots & \vdots & \vdots \\ h_{N-2L-2} & h_{N-2L-2} & \cdots & h_{N-3} & h_{N-2} \\ h_{N-2L-1} & h_{N-2L} & \cdots & h_{N-2} & h_{N-1} \end{bmatrix} +$$

$$\begin{bmatrix} n_1 & n_2 & \cdots & n_{2L} & n_{2L+1} \\ n_2 & n_3 & \cdots & n_{2L+1} & n_{2L+2} \\ \vdots & \vdots & \ddots & \vdots & \vdots \\ n_{N-2L-2} & n_{N-2L-2} & \cdots & n_{N-3} & n_{N-2} \\ n_{N-2L-1} & n_{N-2L} & \cdots & n_{N-2} & n_{N-1} \end{bmatrix}$$

In this context, H' should not be confused with the "classical" MIMO channel expression. In the currently discussed arrangement, reference is made to SISO system, where each row in equation (15) is one of the vectors defined in equation (4).

Next is found a vector w such that the new estimate $$\tilde{h} = (w^H \hat{H}'^T)^T = \hat{H}' w^* \quad (16)$$

is minimized by means of a mean square error on the following error function:

$$e = h - \tilde{h}$$

The minimization problem may be expressed by:

$$\frac{d}{dw^*}(tr(E[ee^H])) = \frac{d}{dw^*}(E[tr(ee^H)]) = \frac{d}{dw^*}(E[e^H e]) = 0 \quad (17)$$

which means that $$\frac{d}{dw^*}(E[e^H e]) = \frac{d}{dw^*}\left(E\left[(h - \hat{H}' w^*)^H (h - \hat{H}' w^*)\right]\right) \quad (18)$$

$$= \frac{d}{dw^*}\left\{E\left[h^H h + (w^*)^H \hat{H}'^H \hat{H}' w^* - 2Re((w^*)^H \hat{H}'^H h)\right]\right\}$$

$$= 2E[\hat{H}'^H \hat{H}']w^* - 2E[\hat{H}'^H h]^*$$

$$= 2(E[H'^H H'] + E[N'^H N'])w^* - 2E[H'^H h]^* = 0$$

Similar to equation (8), the following relationship may be defined:

$$R'_h = \frac{E[H'^H H'] + E[N'^H N']}{(N - 2L - 1)} \quad (19)$$

and by observing $$E[N'^H N'] = (N - 2L - 1)N_0 I \quad (20)$$

$$E[H'^H h] = (N - 2L - 1)(R_h' - N_0 I)u_{L+1} \quad (21)$$

the final Wiener filter equation may be obtained:

$$w=(R'_{\hat{h}})^{-1}(R'_{\hat{h}}-N_0I)u_{L+1}=u_{L+1}-N_0(R'_{\hat{h}})^{-1}u_{L+1} \quad (22)$$

It may seem that equation (22) is quite different from equation (11). However equation (10) uses the correlation matrix of the real channel $R_h$, while in equation (22) a correlation matrix of the coarse channel estimation $R'_{\hat{h}}$ is used, which includes the noise term $N_0I$.

In the case of completely accurate correlation matrices, $$R'_{\hat{h}}=R_h+N_0I$$

the equations (11) and (22) of w coincide.

Conversely, the difference between equations (11) and (22) may be appreciated when w is computed starting from a noisy estimation of $R'_{\hat{h}}$, which is usually the case such as in 802.11a/n systems.

In that respect the following describes an embodiment which addresses this problem.

In case the real values of the correlation matrix $R'_{\hat{h}}$ of equation (22) are unavailable, the Wiener filter expression can be approximated by:

$$w \approx u_{L+1}-N_0(\hat{R}'_{\hat{h}})^{-1}u_{L+1} \quad (23)$$

which means that $R'_{\hat{h}}$ is replaced by a noisy estimation $\hat{R}'_{\hat{h}}$.

A further embodiment of the disclosure provides a suitable estimator for the correlation matrix.

Considering by means of example only, a system with 64 carriers, wherein the carriers $\{0,29,30,31,32,33,34,35\}$ are unknown.

According to the 802.11n standard [3], the classic approach would be to separately compute the coefficients:

$$\hat{r}_0 = \frac{1}{56}\sum_{\substack{k=1\div 28 \\ k=36\div 63}}|\hat{h}_k|^2, \quad (24)$$

$$\hat{r}_1 = \frac{1}{55}\sum_{\substack{k=1\div 27 \\ k=36\div 62}}\hat{h}_k^*\hat{h}_{k+1}, \ldots \hat{r}_{2L} = \frac{1}{56-2L}\sum_{\substack{k=1\div 28-2L \\ k=36\div 63-2L}}\hat{h}_k^*\hat{h}_{k+2L} \quad (25)$$

and to build the correlation matrix by preserving the ideal Toeplitz structure:

$$\hat{R}'_{\hat{h}} = \begin{bmatrix} \hat{r}_0 & \hat{r}_1 & \ldots & \hat{r}_{2L-1} & \hat{r}_{2L} \\ \hat{r}_1^* & \hat{r}_0 & \ldots & \hat{r}_{2L-2} & \hat{r}_{2L-1} \\ \vdots & \vdots & \ddots & \vdots & \vdots \\ \hat{r}_{2L-1}^* & \hat{r}_{2L-2}^* & \ldots & \hat{r}_0 & \hat{r}_1 \\ \hat{r}_{2L}^* & \hat{r}_{2L-1}^* & \ldots & \hat{r}_1^* & \hat{r}_0 \end{bmatrix} \quad (25)$$

However, this approach may not work properly in highly correlated channels and $R'_{\hat{h}}$ is frequently ill-conditioned, both of which may lead to, e.g., when $|w|>1$, an amplification of the noise power instead of is suppression.

In order to illustrate this problem, by means of example only, the channel estimation gains for a SISO system with exponentially decaying PDP are compared.

This means that the effective correlation matrix can be computed according to:

$$PDP(t) = K\exp\left(-\frac{t}{\tau_{RMS}}\right) \quad (26)$$

where $\tau_{RMS}$ is the root mean square temporal spread of the channel and K is a parameter to set the average power per carrier (after FFT processing) equal to one.

By means of simulation the effect of the use of the effective $R'_{\hat{h}}$ or its estimation as shown in equation (25) has been evaluated for different filter lengths L.

Figure 5A:
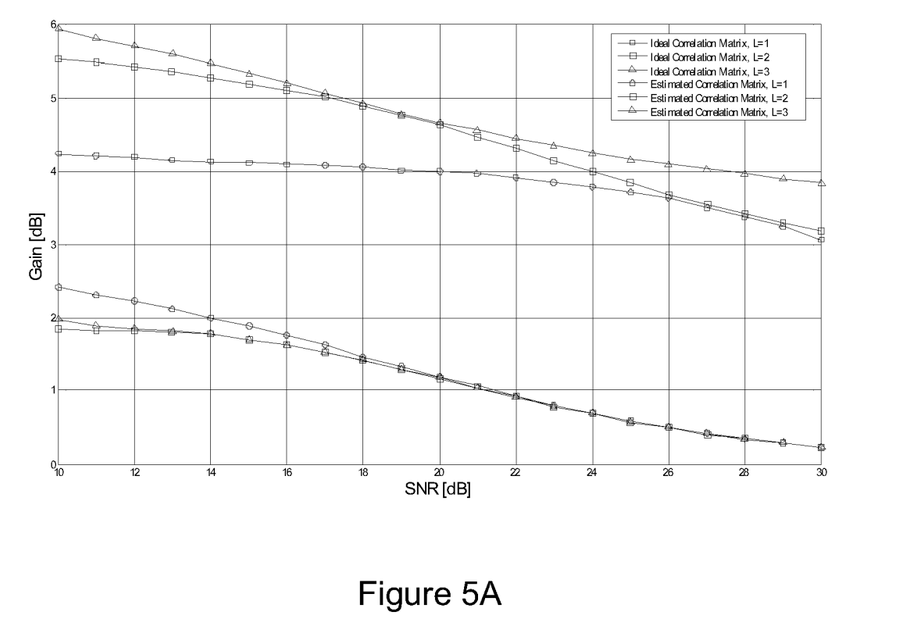
FIGS. 5A to 5C show results for various channel estimators.

In that respect FIG. 5A shows the simulation results obtained from an embodiment.

From these simulations, one can see that the ideal Wiener filter shows good gains (growing with the number L of considered carriers), while the estimated filter is significantly below the ideal gain.

Therefore, a further embodiment of the disclosure is an arrangement, which provides a better estimation of $R'_{\hat{h}}$ by defining:

$$\hat{R}'_h = \frac{\hat{H}'^H \hat{H}'}{56-4L} \quad (27)$$

which respects equation (19) but does not oblige $\hat{R}'_{\hat{h}}$ to be a Toeplitz matrix, thus reducing the problem of ill-conditioning.

H' is defined as in equation (15). However, in the following, a number of virtual carriers larger than one is considered.

With this new estimation, the gain losses are significantly reduced with respect to equation (25).

Figure 5B:
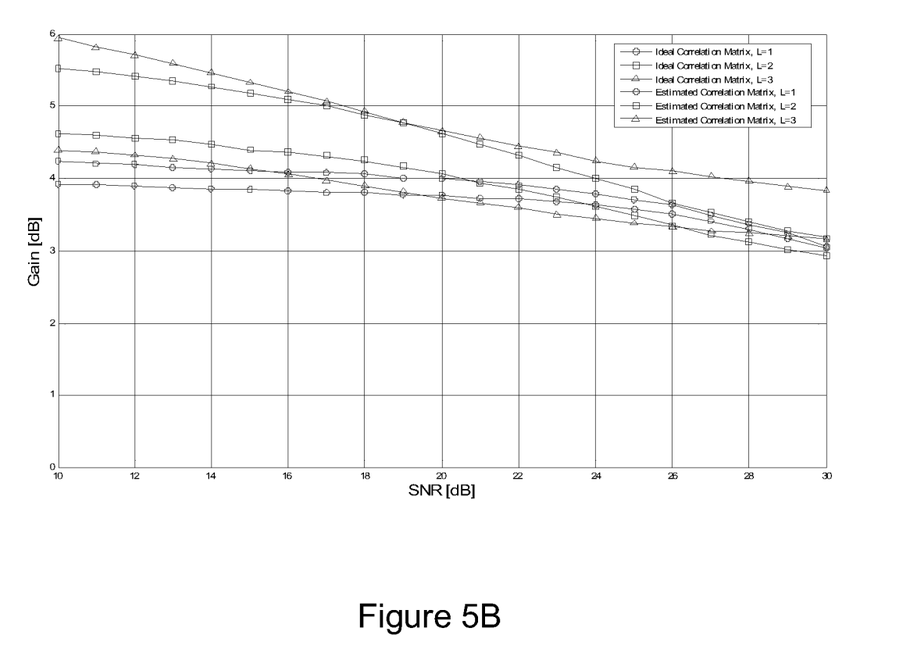

In that respect FIG. 5B shows the simulation results obtained with an arrangement according to an embodiment of the disclosure.

In an embodiment, a Wiener filter with L=1 is used, because:

the simulation results demonstrate that the performance of the Wiener filter with L=1 is similar to those with larger L, for larger values of the parameter L the gap between the ideal and real estimations is increasing, because the approximated Wiener filter suffers from inaccuracies over the estimation of the correlation matrix. For example, the real filter with L=3 is worse than that with L=2.

the number of computations required by the filter with L=1 is significantly smaller than in the case of larger L, i.e., in the case of L=2 the channel matrix $\hat{H}'$ would have two more columns and, as a consequence, a 5×5 matrix is inverted, instead of a 3×3 matrix.

Figure 6:
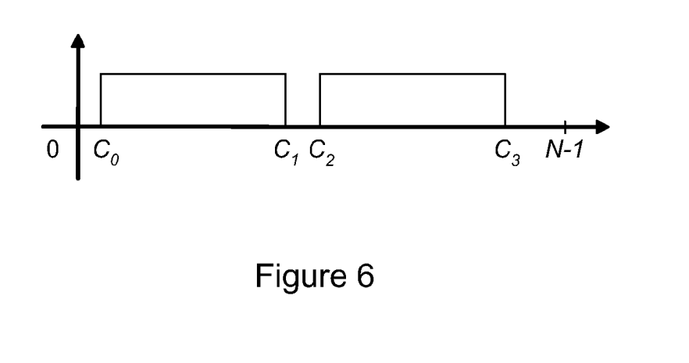
FIG. 6 shows an exemplary clustering of carriers in OFDM communication.

The following description will deal mainly with the case of L=1 and two clusters of carriers as shown in FIG. 6, without loss of generality.

Accordingly, equation (15) is written for L=1 and taking into account the processing of two clusters of carriers, instead of processing only one cluster.

Usually virtual carriers are located not only near DC (zero frequency), but also around the Nyquist frequency.

Therefore, equation (15) becomes:

$$H' = \begin{bmatrix} h_1 & h_2 & h_3 \\ h_2 & h_3 & h_4 \\ \vdots & \vdots & \vdots \\ h_{25} & h_{26} & h_{27} \\ h_{26} & h_{27} & h_{28} \\ h_{36} & h_{37} & h_{38} \\ h_{37} & h_{38} & h_{39} \\ \vdots & \vdots & \vdots \\ h_{60} & h_{61} & h_{62} \\ h_{61} & h_{62} & h_{63} \end{bmatrix} \quad N' = \begin{bmatrix} n_1 & n_2 & n_3 \\ n_2 & n_3 & n_4 \\ \vdots & \vdots & \vdots \\ n_{25} & n_{26} & n_{27} \\ n_{26} & n_{27} & n_{28} \\ n_{36} & n_{37} & n_{38} \\ n_{37} & n_{38} & n_{39} \\ \vdots & \vdots & \vdots \\ n_{60} & n_{61} & n_{62} \\ n_{61} & n_{62} & n_{63} \end{bmatrix} \quad \hat{H}' = \begin{bmatrix} \hat{h}_1 & \hat{h}_2 & \hat{h}_3 \\ \hat{h}_2 & \hat{h}_3 & \hat{h}_4 \\ \vdots & \vdots & \vdots \\ \hat{h}_{25} & \hat{h}_{26} & \hat{h}_{27} \\ \hat{h}_{26} & \hat{h}_{27} & \hat{h}_{28} \\ \hat{h}_{36} & \hat{h}_{37} & \hat{h}_{38} \\ \hat{h}_{37} & \hat{h}_{38} & \hat{h}_{39} \\ \vdots & \vdots & \vdots \\ \hat{h}_{60} & \hat{h}_{61} & \hat{h}_{62} \\ \hat{h}_{61} & \hat{h}_{62} & \hat{h}_{63} \end{bmatrix} \quad (28)$$

As can be seen in equation (28), $\hat{H}'$ can be divided into two blocks $\hat{A}$ and $\hat{B}$, such that:

$$\hat{A} = \begin{bmatrix} \hat{h}_1 & \hat{h}_2 & \hat{h}_3 \\ \hat{h}_2 & \hat{h}_3 & \hat{h}_4 \\ \vdots & \vdots & \vdots \\ \hat{h}_{25} & \hat{h}_{26} & \hat{h}_{27} \\ \hat{h}_{26} & \hat{h}_{27} & \hat{h}_{28} \end{bmatrix} \hat{B} = \begin{bmatrix} \hat{h}_{36} & \hat{h}_{37} & \hat{h}_{38} \\ \hat{h}_{37} & \hat{h}_{38} & \hat{h}_{39} \\ \vdots & \vdots & \vdots \\ \hat{h}_{60} & \hat{h}_{61} & \hat{h}_{62} \\ \hat{h}_{61} & \hat{h}_{62} & \hat{h}_{63} \end{bmatrix} \quad (29)$$

As a consequence, the problem of simplifying equation (27) can be split in two parts:

$$\hat{H}'^H \hat{H}' = \begin{bmatrix} \hat{A} \\ \hat{B} \end{bmatrix}^H \begin{bmatrix} \hat{A} \\ \hat{B} \end{bmatrix} = \hat{A}^H \hat{A} + \hat{B}^H \hat{B} \quad (30)$$

Consider in a first instance the matrix $\hat{A}$, which corresponds to the first half of tones; the same principles may also be applied to the matrix $\hat{B}$.

In a further embodiment, the matrix $\hat{A}$ is split in two additional parts $\hat{A}'$ and $\hat{A}''$:

$$\hat{A}' = \begin{bmatrix} 0 & 0 & \hat{h}_3 \\ 0 & \hat{h}_3 & \hat{h}_4 \\ \hat{h}_3 & \hat{h}_4 & \hat{h}_5 \\ \vdots & \vdots & \vdots \\ \hat{h}_{24} & \hat{h}_{25} & \hat{h}_{26} \\ \hat{h}_{25} & \hat{h}_{26} & 0 \\ \hat{h}_{26} & 0 & 0 \end{bmatrix} \hat{A}'' = \begin{bmatrix} \hat{h}_1 & \hat{h}_2 & 0 \\ \hat{h}_2 & 0 & 0 \\ 0 & 0 & 0 \\ \vdots & \vdots & \vdots \\ 0 & 0 & 0 \\ 0 & 0 & \hat{h}_{27} \\ 0 & \hat{h}_{27} & \hat{h}_{28} \end{bmatrix} \quad (31)$$

This means that the product of $\hat{A}^H \hat{A}$ can be written as the sum of two terms:

$$\hat{A}^H \hat{A} = (\hat{A}' + \hat{A}'')^H (\hat{A}' + \hat{A}'') = \quad (32)$$
$$= \hat{A}'^H \hat{A}' +$$
$$\begin{bmatrix} |\hat{h}_1|^2 + |\hat{h}_2|^2 & \hat{h}_1^* \hat{h}_2 + \hat{h}_2^* \hat{h}_3 + \hat{h}_{26}^* \hat{h}_{27} & \hat{h}_1^* \hat{h}_3 + \hat{h}_2^* \hat{h}_4 + \hat{h}_{25}^* \hat{h}_{27} + \hat{h}_{26}^* \hat{h}_{28} \\ (\hat{h}_1^* \hat{h}_2 + \hat{h}_2^* \hat{h}_3 + \hat{h}_{26}^* \hat{h}_{27})^* & |\hat{h}_2|^2 + |\hat{h}_{27}|^2 & \hat{h}_2^* \hat{h}_3 + \hat{h}_{26}^* \hat{h}_{27} + \hat{h}_{27}^* \hat{h}_{28} \\ (\hat{h}_1^* \hat{h}_3 + \hat{h}_2^* \hat{h}_4 + \hat{h}_{25}^* \hat{h}_{27} + \hat{h}_{26}^* \hat{h}_{28})^* & (\hat{h}_2^* \hat{h}_3 + \hat{h}_{26}^* \hat{h}_{27} + \hat{h}_{27}^* \hat{h}_{28})^* & |\hat{h}_{27}|^2 + |\hat{h}_{28}|^2 \end{bmatrix}$$

wherein the first term of equation (32) shows a Toeplitz structure:

$$\hat{A}'^H \hat{A}' = \begin{bmatrix} \alpha & \beta & \gamma \\ \beta^* & \alpha & \beta \\ \gamma^* & \beta^* & \alpha \end{bmatrix}, \quad (33)$$

$$\alpha = \sum_{k=3}^{26} |\hat{h}_k|^2,$$

$$\beta = \sum_{k=3}^{25} \hat{h}_k^* \hat{h}_{k+1},$$

$$\gamma = \sum_{k=3}^{24} \hat{h}_k^* \hat{h}_{k+2}$$

In this way, only the elements in the first row of $\hat{A}'^H \hat{A}'$ have to be computed, and the other elements can be obtained in a straightforward way by exploiting the Toeplitz structure, and finally sum the 3×3 correction matrix, shown as the second term in equation (32) and which contains the boundary elements of $\hat{A}$.

This leads to a complexity reduction close to 50% for the correlation matrix $\hat{R}'_{\hat{h}}$ estimation, even assuming the exploitation of the Hermitian structure also in the full complexity case of equation (27).

In a further embodiment, a further approximation $\hat{R}''_{\hat{h}}$ for the correlation matrix $R'_{\hat{h}}$ estimation is realized:

$$w \approx u_2 - N_0 (\hat{R}''_{\hat{h}})^{-1} u_2 \quad (34)$$

This approximation includes constraining complex-conjugate symmetry relative to the $\hat{R}''_{\hat{h}}$ central element:

$$\hat{R}''_h = \frac{1}{2}(\hat{R}'_h + F \hat{R}'^*_h F) \quad (35)$$

where $$F = \begin{bmatrix} 1 & 0 & 0 \\ 0 & 1 & 0 \\ 0 & 0 & 1 \end{bmatrix}$$

is the matrix which realizes the column (row) flipping of a matrix which left (right) multiplies it.

In this way, the Wiener filter w has complex conjugate symmetry with respect to the central (real) element.

This can be seen from equation (34), because $$u_2 = [0\ 1\ 0]^T$$

is symmetric and $(\hat{R}''_{\hat{h}})^{-1}$ preserves the symmetry (in the complex conjugate sense) with respect to its central element, so that the central column selected by $u_2$ is symmetric too.

Figure 5C:
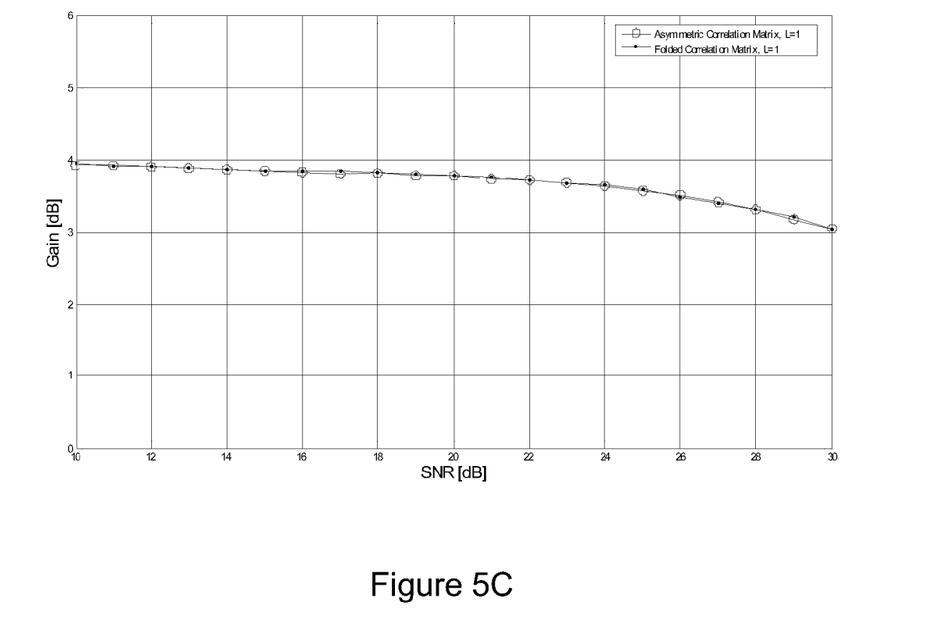

In that respect, FIG. 5C shows another embodiment, although introducing savings in computations (half of the elements can be immediately obtained by the other ones by flipping the polarity of the imaginary parts), does not introduce any further performance degradation.

A further embodiment considers general SISO/MIMO-OFDM systems, but with only one carrier per side (L=1). This can be achieved by generalizing equations (33), (34) and (35) to a generic position of the four boundary carriers $C_0$, $C_1$, $C_2$ and $C_4$, as shown in FIG. 6. This allows processing for any kind of systems, using OFDM modulation.

In this context, the embodiment is typically used when the DC is unknown ($C_0>0$) and when the two clusters are disjoint ($C_2-C_1>1$).

For example, these two conditions are always satisfied in 802.11a and 802.11n systems and, therefore, the embodiment might be used for those standards.

Under the above hypotheses, the estimated (folded) correlation matrix may be expressed as:

$$\hat{R}''_h = \frac{1}{(C_1-C_0)+(C_3-C_2)-2}\begin{bmatrix} \alpha+\delta & \beta & \gamma \\ \beta^* & \alpha+\vartheta & \beta \\ \gamma^* & \beta^* & \alpha+\delta \end{bmatrix} \quad (36)$$

where:

$$\alpha = \sum_{\substack{k=C_0+2 \div C_1-2 \\ k=C_2+2 \div C_3-2}} |\hat{h}_k|^2, \quad (37)$$

$$\beta = \frac{1}{2}\sum_{\substack{k=C_0,C_1-1 \\ k=C_2,C_3-1}} \hat{h}_k^*\hat{h}_{k+1} + \sum_{\substack{k=C_0+1 \div C_1-2 \\ k=C_2+1 \div C_3-2}} \hat{h}_k^*\hat{h}_{k+1},$$

$$\gamma = \sum_{\substack{k=C_0 \div C_1-2 \\ k=C_2 \div C_3-2}} \hat{h}_k^*\hat{h}_{k+2},$$

$$\delta = \frac{1}{2}\sum_{\substack{k=C_0,C_0+1,C_1-1,C_1 \\ k=C_2,C_2+1,C_3-1,C_3}} |\hat{h}_k|^2,$$

$$\vartheta = \sum_{\substack{k=C_0+1,C_1-1 \\ k=C_2+1,C_3-1}} |\hat{h}_k|^2$$

Consequently, the approximated Wiener filter of equation (34) may be rewritten as:

$$w = \begin{bmatrix} 0 \\ 1 \\ 0 \end{bmatrix} - N_0\frac{(C_1-C_0)+(C_3-C_2)-2}{(\alpha+\vartheta)x+2R\{\beta y\}}\cdot\begin{bmatrix} y \\ x \\ y^* \end{bmatrix} \quad (38)$$

where:

$$x = (\alpha+\delta)^2 - |\gamma|^2 \quad (39)$$
$$y = \beta\gamma^* - (\alpha+\delta)\beta^*$$

An embodiment implements equations (37), (39) and finally (38), with a considerable reduction of the overall complexity, relative to the general formulation provided in the previous sections.

This kind of approach may be applied to any kind of OFDM system, with a SISO, SIMO or MIMO architecture.

By way of example, according to the IEEE 802.11 standard, the values of $C_0$, $C_1$, $C_2$ and $C_3$ for 802.11a and 802.11n systems are:

| | $C_0$ | $C_1$ | $C_2$ | $C_3$ |
|---|---|---|---|---|
| 802.11 a | 1 | 2 6 | 3 8 | 6 3 |
| 802.11 n | 1 | 2 8 | 3 6 | 6 3 |

Figure 7:
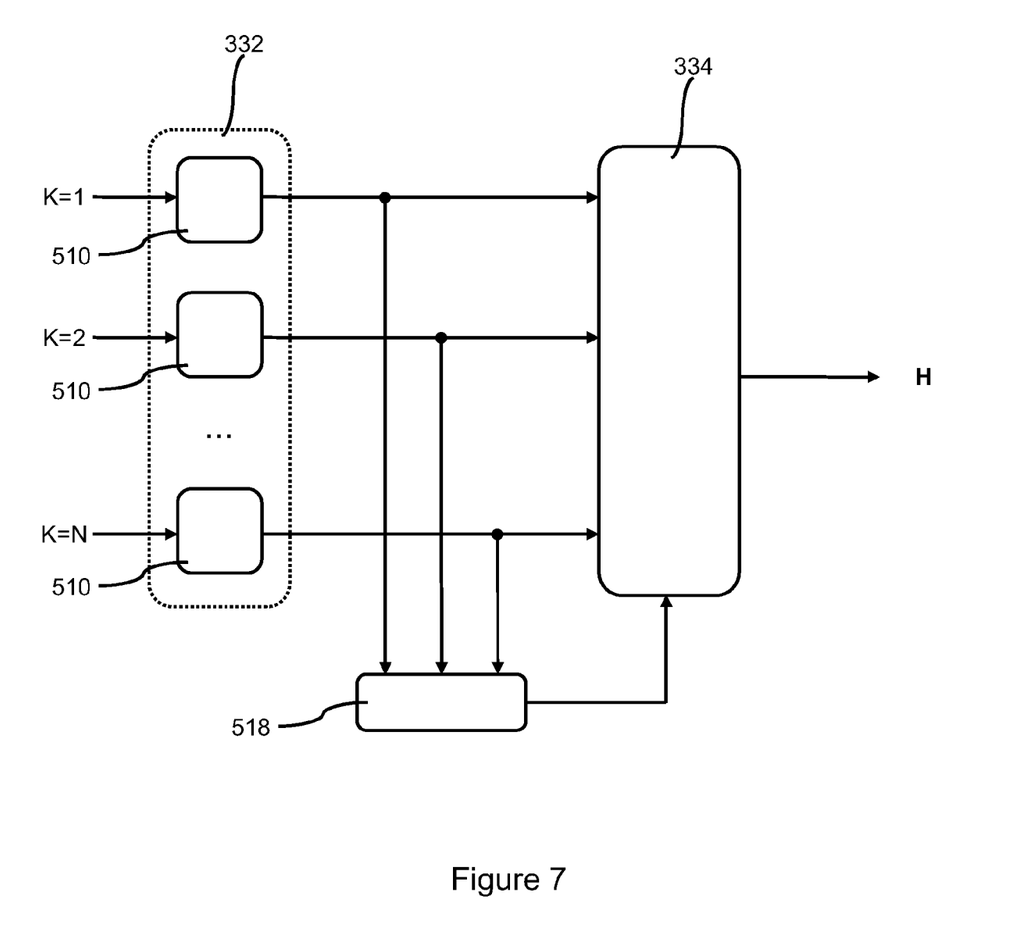
FIG. 7 shows a further embodiment of the disclosure.

FIG. 7 shows, in that respect, an alternative arrangement implementing the optimized channel estimator for SISO/MIMO-OFDM systems.

As already shown in FIG. 4, by means of the blocks 510 coarse channel estimates are calculated for each of the tones $K=\{1,\ldots,N\}$.

The channel correlation matrix R is calculated according to equations (28) and (33) in this alternative embodiment. Therefore, in a pre-processing stage represented by a block 518, the parameters α, β and γ are estimated as shown in equation (33). The estimated parameter are then fed to the channel estimator refinement block 334, which calculates the refined channel estimation matrix H.

Without prejudice to the underlying principles of the disclosure, the details and the embodiments may vary, even appreciably, with reference to what has been described by way of example only, without departing from the spirit and scope of the disclosure.

References

[1] I. E. Telatar, "Capacity of Multi-Antenna Gaussian Channels," European Trans. Tel., 10, 6, 585-595, November, 1999.

[2] G. J. Foschini and M. Gans, "On the Limits of Wireless Communication in a Fading Environment," Wireless Pers. Comm., 6, 311-355, March, 1998.

[3] IEEE P802.11n™/D1.0, "Draft Amendment to [ . . . ]-Part 11: Wireless LAN Medium Access Control (MAC) and Physical Layer (PHY) specifications: Enhancements for Higher Throughput", A. Stephens et al.

[4] IEEE Project P802.16-2004/Cor1-D5, Draft Corrigendum to IEEE Standard for Local and Metropolitan Area Networks—Part 16: Air Interface for Fixed Broadband Wireless Access Systems.

[5] Requirements and recommendations for WiMAX Forum™ Mobility Profiles, WiMAX, Service Providers Working Group, November 2005.

[6] Ye (Geoffrey) Li, Nambirajan Seshadri and Sirikiat Ariyavisitakul, "Channel Estimation for OFDM Systems with Transmitter Diversity in Mobile Wireless Channels", IEEE Journal on Selected Areas in Communications, 461-471, March 1999.

[7] Michele Morelli and Umberto Mengali, "A comparison of Pilot-Aided Channel Estimation Methods for OFDM Systems", IEEE Transactions on Signal Processing, 3065-3073, December 2001.

[8] Ye (Geoffrey) Li, "Simplified Channel Estimation for OFDM Systems With Multiple Transmit Antennas", 67-74, January 2002.

[9] Quazi Mehbubar Rahman and Mostafa Hefnawi, "Channel Estimation Methods for MIMO-OFDM System: Time Domain Versus Frequency Domain"

[10] O. Edfors, M. Sandell, J. J. van de Beek, S. K. Wilson, and P. O. Borjesson, OFDM Channel Estimation by Singular Value Decomposition", IEEE Trans. On Communications, 46-47, July 1998.

[11] L. Deneire, P. Vandenameele, L. van der Perre, B. Gyselinckx, M. Engels, "A low complexity ML channel estimator for OFDM", IEEE Communications, ICC, 1461-1465, 2001.

What is claimed is:

1. A method of channel estimation in orthogonal frequency-division multiplexing communication employing at least three subcarriers, wherein frequency correlation exists between said subcarriers, the method including:
calculating a coarse channel estimate for each of said at least three subcarriers, and calculating from said coarse channel estimates refined channel estimates for each of said at least three subcarriers, wherein said calculation of said refined channel estimates includes:

calculating the parameters of a Wiener Filter having a length of 2L+1, where L is a non-negative integer, and filtering said coarse channel estimates with said Wiener Filter.

2. The method of claim 1, wherein at least one long training symbol preamble is transmitted in said communication.

3. The method of claim 2, wherein said coarse channel estimates are calculated from said at least one long training symbol preamble.

4. The method of claim 3, wherein said calculating the parameters of said Wiener Filter includes:

calculating an auto-correlation matrix, calculating the parameters of said Wiener Filter from said auto-correlation matrix.

5. The method of claim 4, wherein said auto-correlation matrix is calculated from said coarse channel estimates.

6. The method of claim 5, wherein said auto-correlation matrix is calculated by minimizing the mean square error between the real channel and the channel estimates.

7. The method of claim 5, wherein said auto-correlation matrix is calculated according to:

$$\hat{R}'_h = \frac{\hat{H}'^H \hat{H}'}{56 - 4L}$$

whereby L is a non-negative integer.

8. The method of claim 4, wherein said auto-correlation matrix is made complex conjugate symmetrical.

9. The method of claim 2, wherein said long training symbol preambles are transmitted for a first and a second group of subcarriers.

10. The method of claim 1, wherein said parameters of said Wiener Filter are calculated in order to filter each of said at least three subcarriers by smoothing coarse channel estimates of adjacent subcarrier.

11. The method of claim 10, wherein said parameters of said Wiener Filter are calculated to reduce the noise power of each of said at least three subcarriers independent from the other subcarriers, if said at least three subcarriers are fully uncorrelated.

12. The method of claims 10, wherein said parameters of said Wiener Filter are calculated in order to filter each of said at least three subcarriers by averaging coarse channel estimates of adjacent subcarrier, if said at least three subcarriers are fully correlated.

13. The method of claim 1, wherein L is equal to 1.

14. The method of claim 1, wherein said at least three subcarriers are 64 subcarriers.

15. A method of channel estimation in orthogonal frequency-division multiplexing communication employing at least three subcarriers, wherein frequency correlation exists between said subcarriers, the method including:

calculating a coarse channel estimate for each of said at least three subcarriers, and calculating from said coarse channel estimates refined channel estimates for each of said at least three subcarriers, wherein said calculation of said refined channel estimates includes:

calculating the parameters of a Wiener Filter having a length of 2L+1, where L is a non-negative integer, and filtering said coarse channel estimates with said Wiener Filter;

wherein said parameters of said Wiener Filter are calculated in order to filter each of said at least three subcarriers by smoothing coarse channel estimates of adjacent subcarrier; and wherein said parameters of said Wiener Filter are calculated in order to perform no filtering of said coarse channel estimates in the absence of channel noise.

16. A method of channel estimation in orthogonal frequency-division multiplexing communication employing at least three subcarriers, wherein frequency correlation exists between said subcarriers, the method including:

calculating a coarse channel estimate for each of said at least three subcarriers, and calculating from said coarse channel estimates refined channel estimates for each of said at least three subcarriers, wherein said calculation of said refined channel estimates includes:

calculating the parameters of a Wiener Filter having a length of 2L+1, where L is a non-negative integer, and filtering said coarse channel estimates with said Wiener Filter;

wherein at least one long training symbol preamble is transmitted in said communication;

wherein said coarse channel estimates are calculated from said at least one long training symbol preamble;

wherein said calculating the parameters of said Wiener Filter includes:

calculating an auto-correlation matrix, calculating the parameters of said Wiener Filter from said auto-correlation matrix;

wherein said auto-correlation matrix is calculated from said coarse channel estimates; and wherein said calculation of said auto-correlation matrix includes:

separating said coarse channel estimates into a first group considering the first group of subcarriers and a second group considering the second group of subcarriers, and calculating said auto-correlation matrix by calculating a first and a second term.

17. The method of claim 16, wherein said first term and said second term are calculated by calculating a Toepliz structure.

18. The method of claim 17, wherein the parameters of said Toepliz structure are calculated in a pre-processing stage from said coarse channel estimates.

19. A channel estimator, comprising:

a first estimator operable to receive a signal including at least three correlated carrier frequencies, and calculate a respective first channel estimate for each of the carrier frequencies; and a second estimator coupled to the first estimator and operable to generate parameters of a Wiener Filter, and filter each of the first channel estimates with the Wiener Filter to generate a respective second channel estimate for each of the carrier frequencies, the second channel estimate for a carrier frequency being more accurate than the first channel estimate for the same carrier frequency.

20. A receiver, comprising:
an input node operable to receive a signal including at least three correlated carrier frequencies; and
a channel estimator coupled to the input node and including
- a first estimator operable to calculate a respective first channel estimate for each of the carrier frequencies, and
- a second estimator coupled to the first estimator and operable to generate parameters of a Wiener Filter, and
  filter each of the first channel estimates with the Wiener Filter to generate a respective second channel estimate for each of the carrier frequencies, the second channel estimate for a carrier frequency being more accurate than the first channel estimate for the same carrier frequency.

21. A system, comprising:
a receiver including
  an input node operable to receive a signal including at least three correlated carrier frequencies, and
  a channel estimator coupled to the input node and including
    a first estimator operable to calculate a respective first channel estimate for each of the carrier frequencies, and
    a second estimator coupled to the first estimator and operable to generate parameters of a Wiener Filter, and
    filter each of the first channel estimates with the Wiener Filter to generate a respective second channel estimate for each of the carrier frequencies, the second channel estimate for a carrier frequency being more accurate than the first channel estimate for the same carrier frequency.

22. The system of claim 21 wherein the receiver comprises a single input node.

23. The system of claim 21 wherein:
the receiver comprises multiple input nodes each operable to receive the signal; and
the channel estimator is coupled to the multiple input nodes.

24. A computer readable medium operable to store a program that, when executed by a computer, causes the computer to:
calculate a respective first channel estimate for each carrier frequency of a signal that includes at least three correlated carrier frequencies;
generate parameters of a Wiener Filter; and
filter each of the first channel estimates with the Wiener Filter to generate a respective second channel estimate for each of the carrier frequencies, the second channel estimate for a carrier frequency being more accurate than the first channel estimate for the same carrier frequency.

* * * * *